US008370141B2

(12) United States Patent
Rothschild

(10) Patent No.: US 8,370,141 B2
(45) Date of Patent: Feb. 5, 2013

(54) DEVICE, SYSTEM AND METHOD FOR ENABLING SPEECH RECOGNITION ON A PORTABLE DATA DEVICE

(75) Inventor: Leigh M. Rothschild, Plantation, FL (US)

(73) Assignee: Reagan Inventions, LLC, Sunny Isles Beach, FL (US)

( * ) Notice: Subject to any disclaimer, the term of this patent is extended or adjusted under 35 U.S.C. 154(b) by 1568 days.

(21) Appl. No.: 11/367,986

(22) Filed: Mar. 3, 2006

(65) Prior Publication Data

US 2007/0208563 A1 Sep. 6, 2007

(51) Int. Cl.
- G10L 15/26 (2006.01)
- G10L 13/00 (2006.01)
- H04M 11/10 (2006.01)

(52) U.S. Cl. ...... 704/235; 704/260; 704/270.1; 379/88.01; 379/88.14; 379/88.16

(58) Field of Classification Search ......... 704/235, 704/260, 270, 270.1, 275; 379/88.01, 88.04, 379/88.13, 88.14, 88.16, 88.17
See application file for complete search history.

(56) References Cited

U.S. PATENT DOCUMENTS

| | | | | |
|---|---|---|---|---|
| 5,956,681 | A * | 9/1999 | Yamakita | 704/260 |
| 6,507,643 | B1 * | 1/2003 | Groner | 379/88.14 |
| 6,532,446 | B1 * | 3/2003 | King | 704/270.1 |
| 6,917,917 | B1 * | 7/2005 | Kim | 704/235 |
| 7,151,949 | B2 * | 12/2006 | Cavill et al. | 455/556.1 |
| 7,418,381 | B2 * | 8/2008 | Blair | 704/235 |
| 7,427,018 | B2 * | 9/2008 | Berkun | 235/380 |
| 7,502,741 | B2 * | 3/2009 | Finke et al. | 704/270 |
| 7,775,428 | B2 * | 8/2010 | Berkun | 235/380 |
| 7,925,505 | B2 * | 4/2011 | Wu | 704/236 |
| 8,285,802 | B2 * | 10/2012 | Chang et al. | 709/206 |
| 2003/0187775 | A1 * | 10/2003 | Du et al. | 705/37 |
| 2004/0003041 | A1 * | 1/2004 | Moore et al. | 709/204 |
| 2004/0204938 | A1 * | 10/2004 | Wolfe et al. | 704/235 |
| 2006/0111909 | A1 * | 5/2006 | Maes et al. | 704/270 |
| 2006/0149551 | A1 * | 7/2006 | Ganong et al. | 704/270.1 |
| 2006/0249573 | A1 * | 11/2006 | Berkun | 235/380 |
| 2007/0156400 | A1 * | 7/2007 | Wheeler | 704/235 |
| 2007/0272738 | A1 * | 11/2007 | Berkun | 235/380 |

* cited by examiner

Primary Examiner — Martin Lerner
(74) Attorney, Agent, or Firm — Gerald E. Hespos; Michael J. Porco

(57) ABSTRACT

Devices, systems and methods for converting analog data to digital data or digital data to analog data for enabling speech recognition processing on a portable data device are provided. The system includes at least one portable data device including an input module configured to receive analog audio signals; a processing module configured to convert the analog audio signals to digital audio data; a communication module configured to transmit the digital audio data to a remote processor and to receive digital text data from the remote processor; and a display module for displaying the received digital text data; the remote processor configured for receiving digital audio data, converting the digital audio data to digital text data and transmitting the converted digital text data to the at least one portable data device; and a communications network for coupling the remote processor to the at least one portable data device.

27 Claims, 5 Drawing Sheets

DEVICE, SYSTEM AND METHOD FOR ENABLING SPEECH RECOGNITION ON A PORTABLE DATA DEVICE

BACKGROUND

1. Field

The present disclosure relates generally to portable digital data devices and systems, and more particularly, to devices, systems and methods for converting analog data to digital data or digital data to analog data for enabling speech recognition processing on a portable data device.

2. Description of the Related Art

Wireless data devices are now common. These portable data devices can manage personal information such as contacts, appointments and to-do lists, act as global positioning system (GPS) devices and run multimedia software. Examples of these devices include Windows™ Pocket PC devices which have an operating system created by Microsoft Corporation of Redmond, Wash. Other examples of wireless devices include the Treo™ device created by Palm, Inc. of Sunnyvale, Calif., and the Blackberry™ device created by Research in Motion of Ontario, Canada. Other portable data devices include portable voice recorders and Smartphones such as the Nokia 6230 cellular phone.

Generally, these devices are small digital devices with internal memory, some limited computer processing power (as compared to desktop and laptop devices), and communications capacities such as cellular, Bluetooth, or WiFi communications among others. These devices may also include an input mechanism scaled down to the form factor of the device, e.g., a compact keyboard operated by a user's thumbs.

Many of the devices allow the user to communicate through the global computer network, e.g., the Internet, including sending and receiving e-mail. The devices are generally used in a portable and mobile environment where it is often times difficult, if not impossible, to easily type into the device in order to originate or answer e-mail by example.

It would be ideal for these devices to allow the user to employ speech and/or voice recognition software as a means of communicating with the device (for example, to send or reply to e-mail or to dictate a note in digital text form). However, due to the limited size of the device, current technology does not allow the device to incorporate the more powerful processors that would be necessary to reliably convert analog signals (such as audio voice signals) to digital text data.

In light of the above, a need exists for techniques to enable analog audio signals inputted to a portable data device to be converted to digital text data. A further need exists for techniques to enable speech recognition processing on a portable data device with limited processing power.

SUMMARY

A device, system and method for converting analog data to digital data or digital data to analog data for enabling speech recognition processing on a portable data device are provided. The system and method of the present disclosure allow a user to transmit analog voice data recorded on a portable data device to a data processing terminal, e.g., a remote processor, that will use speech recognition software to convert the analog data to digital data. This data will then be transmitted back to the portable wireless data device or terminal where it can be stored and/or e-mailed to an intended recipient. In another embodiment of the present disclosure, digital text data will be converted to analog audio data by a remote data processing terminal and then using wireless communications technology including Bluetooth technology, Wi-Fi technology, etc. transmitted to a wireless mobile device for data storage and/or e-mail.

According to one aspect of the present disclosure, a method for converting audio data to text data on a portable data device is provided. The method includes the steps inputting analog audio data into the data device; transmitting the audio data to a remote processor; converting the audio data to text data at the remote processor; and receiving the text data at the portable data device. The converting step is performed by a speech recognition algorithm.

In another aspect, the method includes the step transmitting the text data to another terminal via e-mail or instant messaging.

In a further aspect, the method includes receiving at least second text data from at least a second terminal; transmitting the received at least second text data to the remote processor; converting the received at least second text data to at least second audio data; and receiving the converted at least second audio data on the data device. The at least second audio data is then audibly produced at the data device.

In another aspect, the method includes replying to the at least one second audio data by inputting at least third analog audio data into the data device; transmitting the at least third audio data to the remote processor; converting the at least third audio data to at least third text data at the remote processor; receiving the at least third text data at the portable data device; and transmitting the at least third text data to the at least second terminal.

According to another aspect of the present disclosure, a device for converting audio data to text data includes an input module configured to receive analog audio signals; a processing module configured to convert the analog audio signals to digital audio data; a communication module configured to transmit the digital audio data to a remote processor, the remote processor configured to convert the digital audio data to digital text data; the communication module configured to receive the digital text data; and a display module for displaying the received digital text data. The communication module is configured to e-mail or instant message the digital text data to another terminal. The device may further include an editing module for editing the digital text data.

In one aspect, the device is configured as a dictation device having a small form factor.

In another aspect, the communication module is configured to connect to a wireless communications network and to receive voice mail messages, the voice mail message being input to the input module.

In yet another aspect, the device further includes an audible output device configured to audibly produce the text data.

According to another aspect, a system for converting audio data to text data on a portable data device is provided. The system includes at least one portable data device including an input module configured to receive analog audio signals; a processing module configured to convert the analog audio signals to digital audio data; a communication module configured to transmit the digital audio data to a remote processor and to receive digital text data from the remote processor; and a display module for displaying the received digital text data; the remote processor configured for receiving digital audio data, converting the digital audio data to digital text data and transmitting the converted digital text data to the at least one portable data device; and a communications network for coupling the remote processor to the at least one portable data device, wherein the remote processor further include at least one speech recognition algorithm.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A device, system and method for enabling speech recognition on portable data devices are provided. The system and method of the present disclosure will allow a user to record analog voice data on a portable data device and transmit the recorded data to a remote processing terminal to convert the recorded analog data to digital data, e.g., a text file. The digital data will then be transmitted back to the portable data device wherein the user will edit, spell check, store, e-mail, etc. the digital data. It is to be appreciated that for the purposes of this disclosure speech recognition technology refers to hardware and/or software that interprets and converts through at least one algorithm spoken words (i.e., analog audio data) into text data also known as dictation or continuous speech recognition and voice recognition technology refers to hardware and/or software that matches the voice pattern of short commands given by a user (e.g., open, save, etc.) to a predefined library of commands for operating a device or system such as opening application programs, pulling down menus or saving work.

Figure 1:
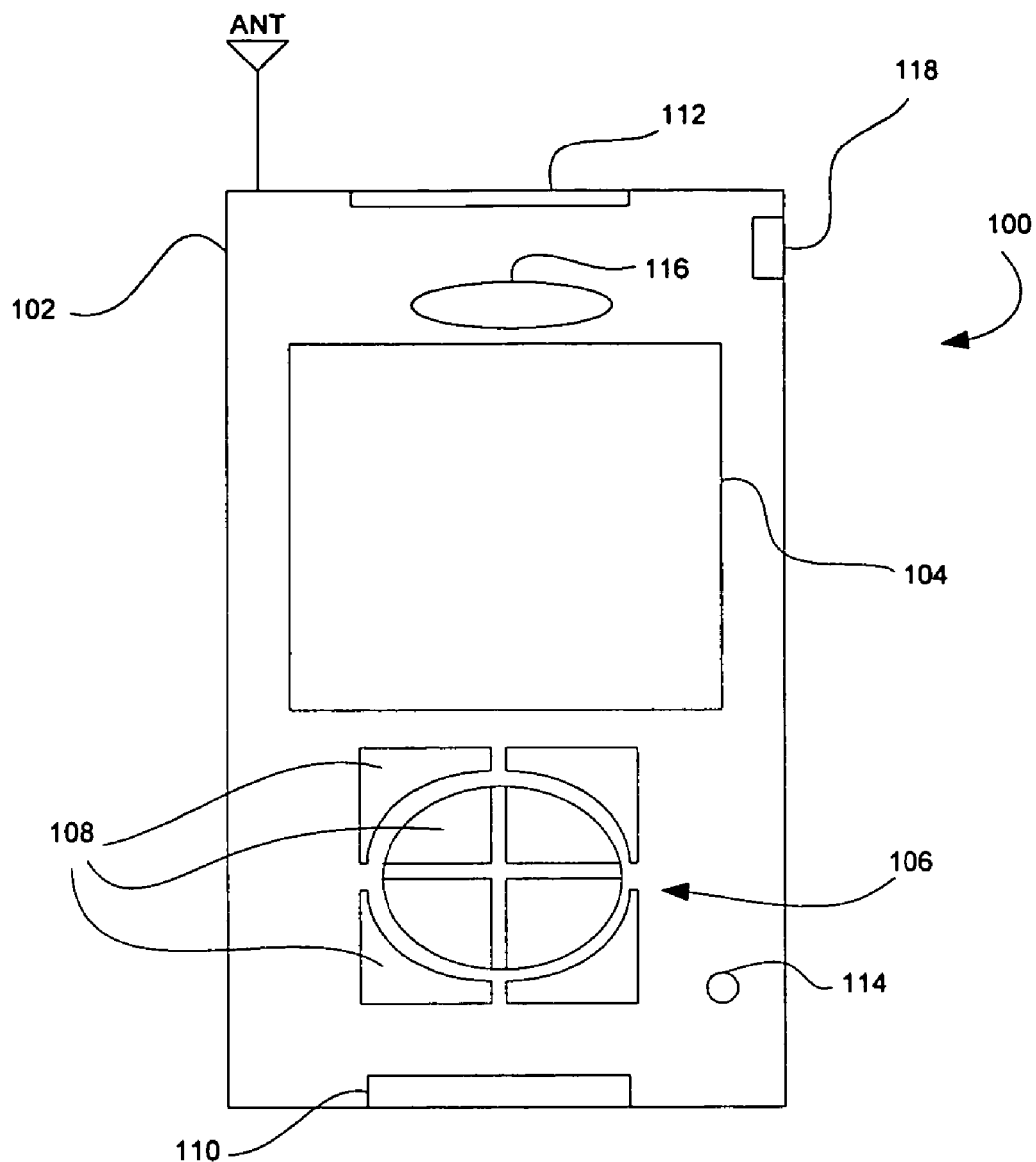
FIG. 1 is front view of a portable data device according to an embodiment of the present disclosure.

Referring to FIG. 1, a portable data device 100 for receiving and playing various types of digital media content, e.g., audio, video, images, software applications, etc., in accordance with an embodiment of the present disclosure is illustrated. The data device 100 includes various electrical components, which will be described in detail below, disposed in a generally rectangular housing 102. A display module 104 is provided for displaying user instructions, text data or files, video and image media content, such as movies, animations, etc.. and a speaker 116 is provided configured to produce audio, e.g., spoken words, music, etc. An audio port 118 will be configured to receive a plug or connector from a headphone, stereo system, etc., to stream the audio to a connected device. It is to be appreciated that when an external device is connected to the audio port 118 the speaker 116 will be disabled. Input module 106 includes a plurality of buttons 108 for inputting data and navigating through a plurality of menus. A touch screen overlaid upon the display module 104 may also be coupled to the input module for facilitating user input. The data device 100 further includes a storage module 110 for storing a plurality of data, files, content, etc. and a communications module 112 for transmitting/receiving data and/or content to another device or terminal, e.g., a personal computer, a personal digital assistant (PDA), a server residing on the Internet, etc. The data device 100 will include a microphone 114 for acquiring audio from the user of the device to input data and/or record spoken messages.

Figure 2:
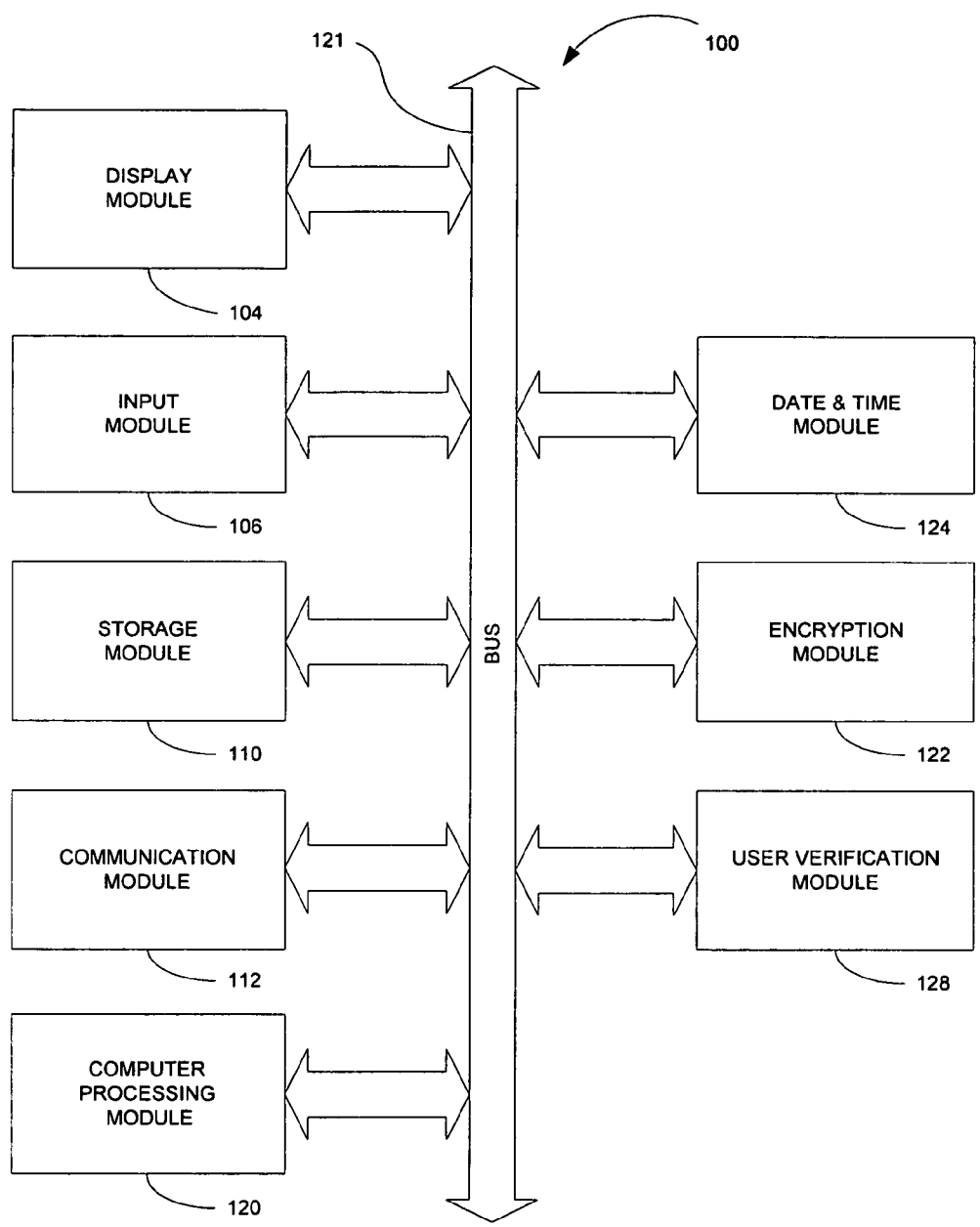
FIG. 2 is a block diagram of various modules included in the device illustrated in FIG. 1.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM) (not shown). The various processes and functions described herein may either be part of the micro instruction code or part of an application program (or a combination thereof) which is executed via the operating system. Exemplary operating systems include Microsoft's Windows Mobile or Windows CE, Palm OS or BlackBerry OS.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer processing module 120 may further include, in addition to a microprocessor, a digital signal processor (DSP) for decoding stored audio, video and photo files to be played on the data device 100. As is known in the art, the DSP may include several known compression/decompression algorithms for compressing/decompressing stored media content, e.g., a MP3 file. The device 100 of the present disclosure will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2, .mpeg4), Microsoft Recorded TV Show files (.dvr-ms), Microsoft Windows Video files (.avi) and Microsoft Windows Audio files (.wav).

The device 100 will also contain a display module 104 for displaying digital information such as text files, video files, image files, etc, and for providing instructions to a user. This display may be in any current form in the art, including Liquid Crystal Displays (LCD), Light emitting diode displays (LED), Cathode Ray Tube Displays (CRT) or any other type of display currently existing or existing in the future. The display module 104 will also include an audio output device, e.g., a speaker 116, audio port 118, etc., for audibly producing audio output from the device 100, e.g., a recorded audio file, a text-to-speech synthesized voice file, a MP3 file, etc. The audio output device will be coupled to the microprocessor or DSP by a digital-to-analog (D/A) converter for converting the digital data received from the microprocessor or DSP to analog signals which can be audibly produced. Optionally, the analog signals output by the D/A converter may be amplified by a conventional amplifier.

The device 100 of the present disclosure will contain a user input module 106 to either receive user instructions via text input by the way of buttons 108, a standard keyboard interface coupled to the device, or a character recognition capture device which translates user text input into alphanumeric characters. Preferably, the character recognition device is a touch screen which overlays the display module 104 and text is entered via a pen-like stylus. Such input devices are standard and currently available on many electronic devices including portable digital assistants (PDAs) and cellular telephones. Microphone 114 will be further coupled to the input module 106 for capturing any audio signals or information spoken by the user and the input module will further include an analog-to-digital (A/D) converter for converting the spoken audio information into a digital format usable by the data device 100, e.g., digital audio data. Furthermore, the input module may include a voice recognition processor or algorithm that translates short spoken words into commands for operating the data device 100. As is known in the art, voice recognition simply matches voice patterns to a predefined library of commands to determine which command was spoken and requires only limited processing power.

The storage module 110 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future.

The communication module 112 will enable the device 100 to transmit or transfer information, e.g., recorded audio files, e-mail messages, text files, etc., to other computing devices and terminals and to receive information from other computing devices and terminals, e.g., converted text data, text-to-speech synthesized audio files, etc. The communication module 112 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission, cellular transmission or any other type of communication protocols or systems currently existing or to be developed for wirelessly transmitting data. The communication module will compress and encode the information for transmission using any known wireless communication technology.

The device 100 will also include an encryption module 122. The encryption module 128 will use conventional code encryption algorithms currently in use or that will be in use in the future such as symmetric-key algorithms, e.g., DES, Triple-DES, Blowfish, RC2, RC4, RC5, etc, and asymmetric-key algorithms, e.g., Diffie-Helman, RSA, ElGamal, etc. to encrypt/decrypt data that is being transmitted to and from the device 100 to ensure privacy. Optionally, the encryption module 122 may be disabled by the user.

Furthermore, the device 100 will include a date and time module 124. The date and time module 124 will use standard computer chip processing technology widely in use, e.g., a crystal, or alternatively, input from a GPS receiver to supply the date and time.

Optionally, the device 100 may include a user verification module 128 for verifying an identity of the user of the device. In this embodiment, the processing module 120 will interact with the user verification module 128 and only allow authorized users to access e-mails, recorded audio messages, etc.

Figure 3:
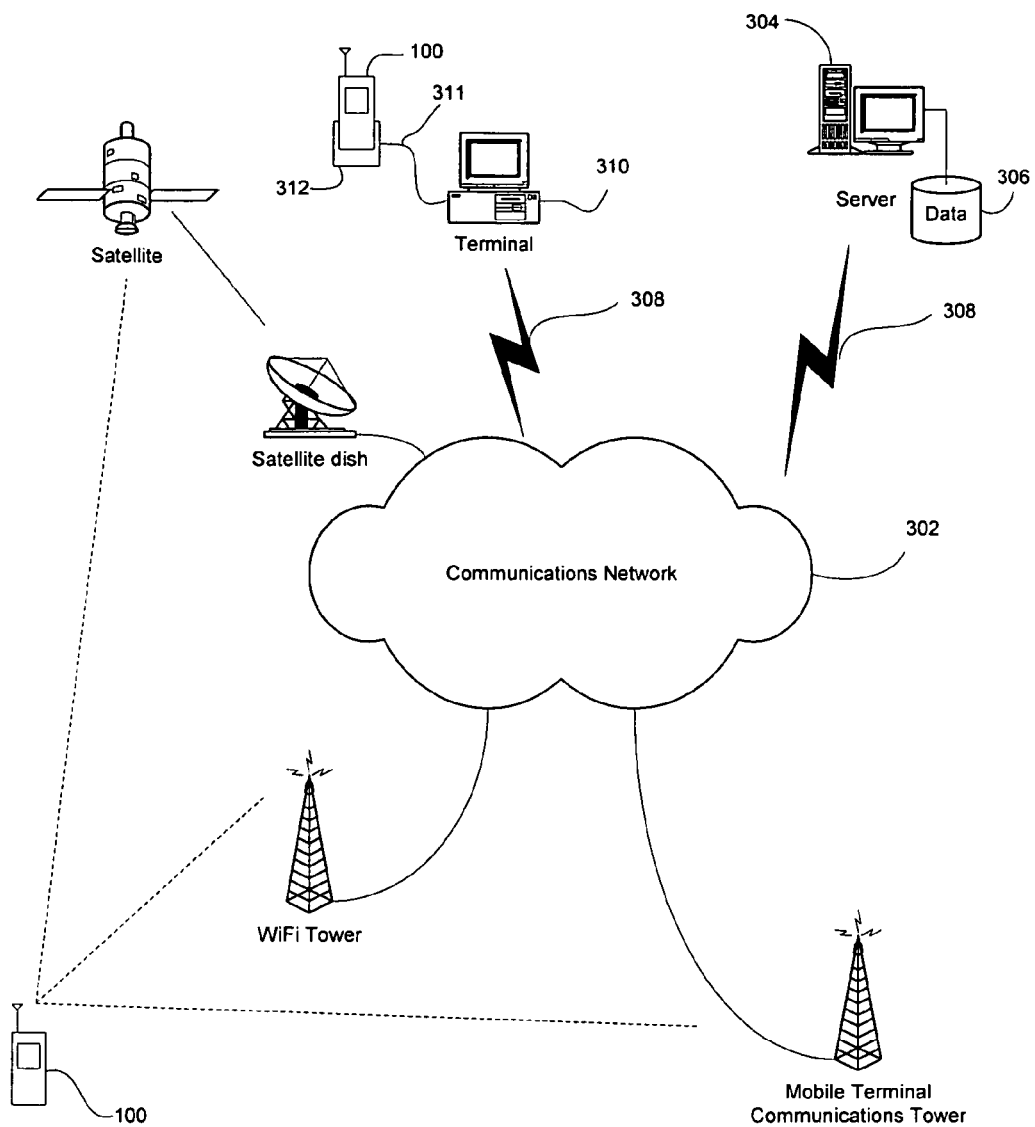
FIG. 3 illustrates a system for converting analog data to digital data or digital data to analog data for enabling speech recognition processing on a portable data device.

A system and method for converting analog data to digital data or digital data to analog data for providing speech recognition on a portable data device will be described in relation to FIGS. 3 and 4. As will be described in more detail below, the portable data device 100 will utilize a remote processor to perform the speech recognition since its on-board processors(s) have limited processing power. Therefore, the data device 100 will connect to a remote processor, e.g., a user's personal computer 310, a remoter network server 304, etc. as illustrated in FIG. 3. The device 100 may be coupled to a personal data terminal 310, e.g., a personal computer, via a cable 311, cradle 312, wireless connection, etc. The portable data device 100 may communicate directly to a remote server 304 via a communication network 302. The server 304 may be connected to the communications network 302, e.g., the Internet, by any known means, for example, a hardwired or wireless connection 308, such as dial-up, hardwired, cable, DSL, satellite, cellular, PCS, wireless transmission (e.g., 802.11a/b/g), etc.. It is to be appreciated that the network 302 may be a local area network (LAN), wide area network (WAN), the Internet or any known network that couples a plurality of computers to enable various modes of communication via network messages. Furthermore, the server 304 will communicate using the various known protocols such as Transmission Control Protocol/ Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

Regardless of whether employing a server or personal computer as the remote processor, it is to be appreciated the remote processor will include a central processing unit (CPU), an operating system, a communications device and a storage medium (such as medium 306) for storing speech libraries, dictionaries, conversion algorithms, etc. for performing the speech recognition. As is known in the art, speech recognition relies on at least one complicated and resource-intensive algorithm to interpret what a user is saying. Many speech recognition algorithms rely on acoustic probability (e.g., via a Hidden Markov Model (HMM) method) and language probability (e.g., via trigram analysis) to determine the user's spoken words. Both of these methods require large databases of information to effectively perform their analysis. To effectively and rapidly perform speech recognition, the remote processor will have a large amount of random access memory (RAM) so the entire database to be analyzed is loaded into RAM instead of having the system search the hard drive and the remote processor will have a fast processor to increase the rate at which the analysis is being performed making the remote processor better suited for speech recognition than the portable data device.

Figure 4:
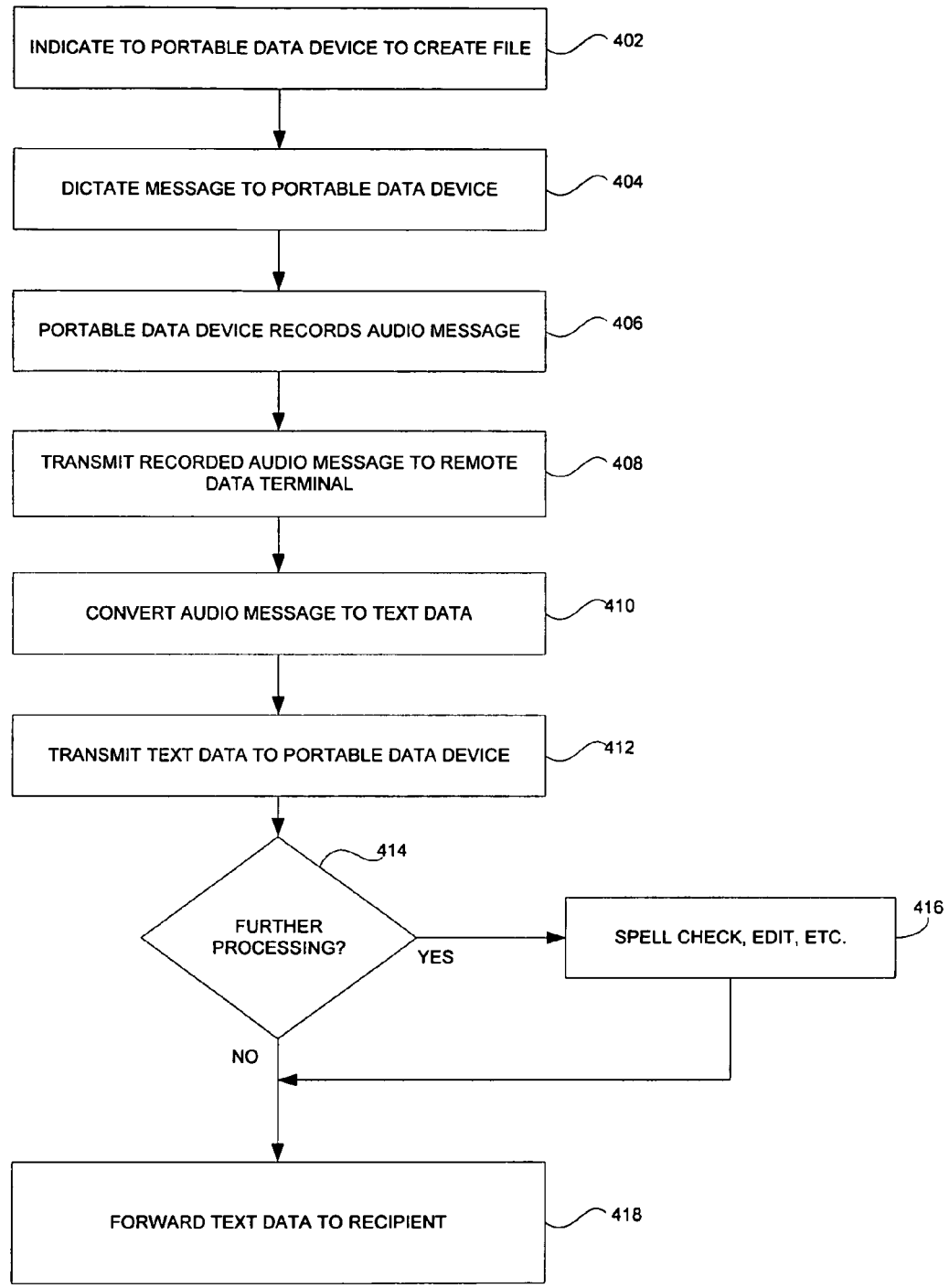
FIG. 4 is a flow diagram illustrating a method for inputting analog audio signals and converting the audio signals to digital data according to an embodiment of the present disclosure.

Referring to FIG. 4, a method for converting analog data to digital data is illustrated. Initially, in step 402, the user indicates to the portable data device 100 that the user desires to create a file. The user may indicate this to the device 100 via input to the touch screen of the display module 104 or buttons 108. Alternatively, the user may speak a command such as "create file" and the device 100 will use on-board voice recognition to determine which command was issued. As described above the voice recognition will utilize only a predefined set of commands and will require less memory and processing power, and therefore, will be implemented on the device 10.

When the device 100 indicates that it is ready to received spoken input, the user may begin to dictate a message (step 404). Although the spoken words are analog signals, these analog signals will be recorded by the device 100 via a analog-to-digital converter to format the spoken words in a form in which the device can store and/or process the inputted information (step 406). Preferably, the spoken words or audio will be stored on the device 100 in an audio file format. An exemplary audio file format is the WAVE (or .wav) audio file format which stores the audio in a raw, uncompressed format meaning that there is no loss of audio being input including background noise.

Once the message has been recorded, the user will indicate to the device 100 to transmit the recorded message for processing (step 408). The device 100 will then employ the communication module 112 to transmit the recorded message to the remote processor. In one embodiment, the user will record a message and transfer the message to the terminal 310 via a hardwired cable 311 or cradle 312. Alternatively, the device 100 may transit the message to the terminal 310 via a wireless protocol described above. In a further embodiment, the device 100 may transmit the message to server 304 via terminal 310 or any wireless protocol described above. Once received by the remote processor or terminal, the remote terminal will process the message with at least one speech recognition algorithm to convert the recorded audio data to a text message or file (step 410). The text message may be stored in any known format, for example, Microsoft Word™, Wordpad™, etc., or preferably in ASCII format so the text may be read by a plurality of interfaces and/or applications.

After the message has been converted to a text file, the remote processor will transmit the text file to the device 100 (step 412). Preferably, the device will alert the user that the processed message has arrived via an audible tone, a spoken word, message on the display module 104, etc. Once received, the device 100 will prompt the user to determine if further processing of the text file is necessary (step 414). The further processing may include spell checking the text file, editing the text file, attaching an image to the file, etc (step 416). To perform the editing functions, the processing module will further include an editing module such as Pocket Word™ commercially available from Microsoft Corporation and is a conventional word processing application implemented on most Pocket PC devices. Once the text file is further processed, the user may forward the text file or data to an intended recipient (step 418). The forwarding to the intended recipient may be via e-mail, instant messaging, or any other known technique.

In one embodiment, the analog recorded message may be processed before transmitting to the remote processor. If recorded as an uncompressed .wav file, the recorded audio file will be large and slow down the transmission process. In this embodiment, the device 100 may compress the audio file before transmission. For example, the device 100 may process the audio file with a lossy compression algorithm, e.g., mp3 compression, to eliminate unnecessary audio recorded and to substantial reduce the size of the file to be transmitted.

In another embodiment, the device may be configured as a dictation device having a relatively small form factor. The dictation device will enable a user to dictate a message or document to be recorded by the device, transmit the document to a remote processor for conversion and then receive back the converted text file. The user may then further process the document, e.g., spell check, edit, etc.) via an attached keyboard or touch screen to place the document in final form. The document may then be e-mailed to a recipient or transmitted to the remote processor, or directly to a wireless-enabled printer, to be printed for mailing to the recipient.

In a further embodiment, the device may include wireless phone capabilities such as a Smartphone. In this embodiment, the device 100 can record an incoming phone message, e.g., a voice mail, and convert the phone message into digital text data via the remote processor as described above. In this manner, the user may process a plurality of voice mails into e-mails which the user may read on the device 100 or may transmit to their local personal computer for later reading.

Figure 5:
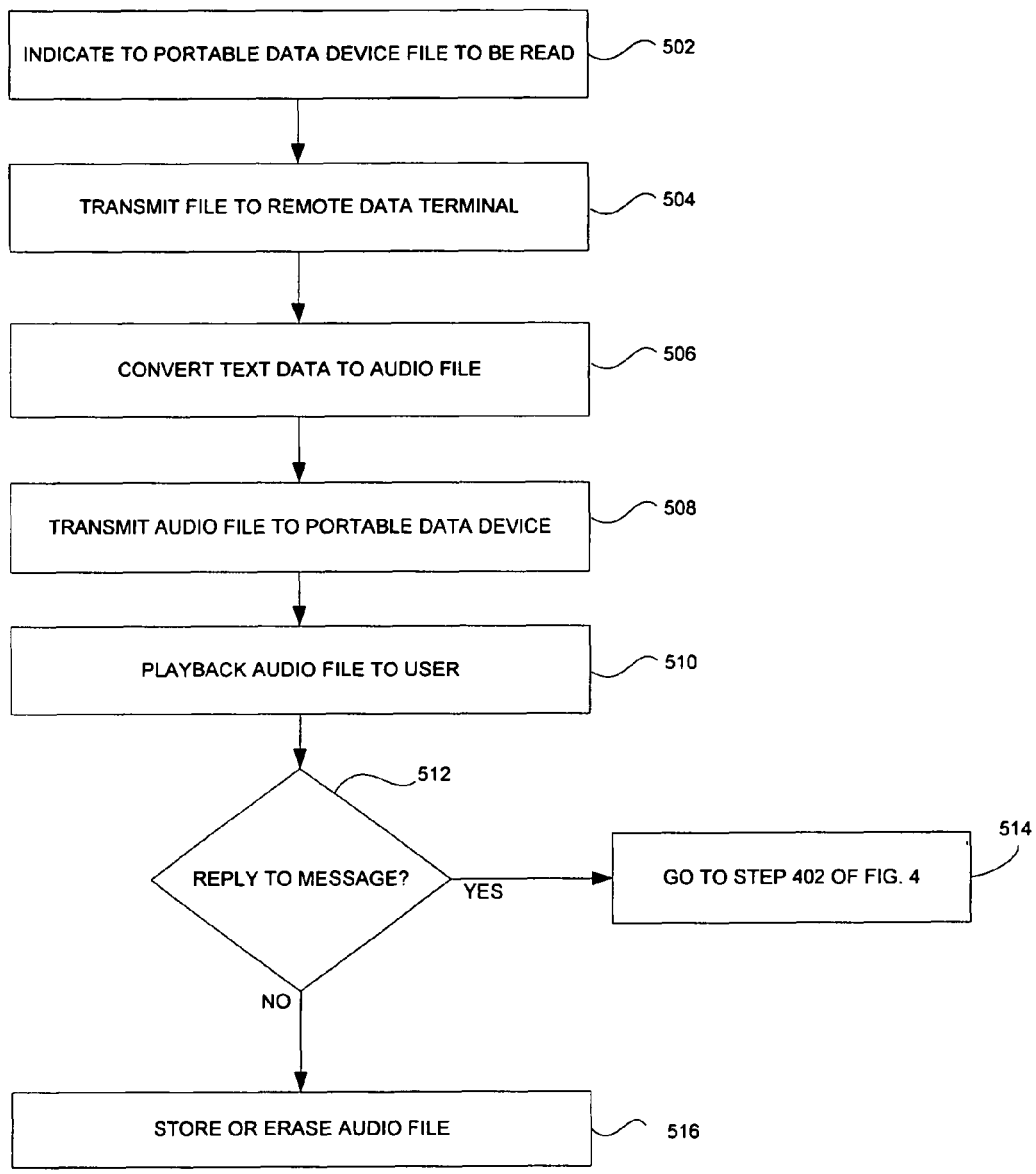
FIG. 5 is a flow diagram illustrating a method for converting digital data to audio data and for replying to the audio data according to another embodiment of the present disclosure.

The user can also employ the system of the present disclosure to reply to messages, e.g., e-mail, instant messages, etc., received at the device 100. Referring to FIG. 5, the user will select a file or message and indicate to the device 100 that the file is to be read to the user (step 502). The device 100 will transmit the selected file to the remote processor via the transmission methods described above (step 504). The remote processor will convert the text message or file to an audio file using conventional text-to-speech synthesis algorithms (step 506). The remote processor will then transmit the audio file back to the device (step 508). The user may now playback the audio file using any known player software such as Windows Media Player 10 Mobile (step 510).

After listening to the audio message, the user will be prompted (or simply elect) to reply to the message (step 512). If the user decides to reply to the message, the user will indicate to the device 100 that the user desired to create a file and the process will follow the steps 402 through 418 as described above. Otherwise, the user may store or erase the audio file (step 516).

It is to be appreciated that the remote processor will employ encryption/decryption algorithms when the data transmitted from the device 100 is encrypted. The remote processor may any type of current encryption algorithms including Blowfish, DES, Cast, or any type of Digital rights Management software including Digital Rights Management software currently offered by Microsoft Corporation of Redmond, Wash.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for converting audio speech data to text data using a portable, wireless data device, the method comprising the steps:

recording an audio file of analog audio speech data on the portable, wireless data device;

converting the analog audio speech data to digital audio data;

transmitting, via a wireless connection using a wireless data protocol, the audio file having the digital audio data to a remote processor;

converting the digital audio data to text data at the remote processor;

receiving, via the wireless connection using the wireless data protocol, the text data at the portable, wireless data device; and transmitting, by the portable, wireless data device, the digital text data to a wireless-enabled printer configured for printing the text data.

2. The method as in claim 1, further comprising the step of transmitting the text data from the portable, wireless data device to a personal data terminal.

3. The method as in claim 2, wherein the step of transmitting the text data to the personal data terminal includes e-mailing the text data to the personal data terminal.

4. The method as in claim 2, wherein the step of transmitting the text data to the personal data terminal includes instant messaging the text data to the personal data terminal.

5. The method as in claim 1, further comprising the step of spell checking the received text data.

6. The method as in claim 1, wherein the converting the digital audio data step is performed by a speech recognition algorithm.

7. The method as in claim 1, further comprising the steps of receiving a voice mail message on the portable, wireless device and transmitting the received voice mail message to the remote processor for converting the voice mail message to text data.

8. The method as in claim 1, further comprising the step of audibly producing the received text data on the portable, wireless data device.

9. The method of as in claim 1, further comprising the steps:
receiving at least second text data from at least one personal data terminal;
transmitting the received at least second text data to the remote processor;
converting the received at least second text data to at least second audio data at the remote processor; and
receiving the at least second audio data on the portable, wireless data device.

10. The method as in claim 9, further comprising the step of audibly producing the at least second audio data.

11. The method as in claim 10, further comprising the steps of:
replying to the at least second audio data by inputting at least third audio data into the portable, wireless device;
transmitting the at least third audio data to the remote processor;
converting the at least third audio data to at least third text data at the remote processor;
receiving the at least third text data at the portable, wireless data device; and
transmitting the at least third text data to the at least one personal data terminal.

12. The method as in claim 1, further comprising compressing the digital audio data before transmitting the audio file having the digital audio data to the remote processor.

13. A portable, wireless device for converting audio speech data to text data, the portable, wireless device comprising:
an input module configured to receive analog audio speech signals;
a processing module configured record an audio file of the analog audio speech signals on the portable, wireless device and to convert the analog audio speech signals to digital audio data;
a communication module configured to transmit the audio file having the digital audio data to a remote processor via a wireless connection using a wireless data protocol, the remote processor configured to convert the digital audio data to digital text data;
the communication module configured to receive the digital text data via the wireless connection using the wireless data protocol; and
a display module for displaying the received digital text data;
wherein the communication module is further configured to transmit the digital text data to a wireless-enabled printer configured to print the digital text data.

14. The device as in claim 13, wherein the communication module is configured to e-mail the digital text data to a personal data terminal.

15. The device as in claim 13, wherein the communication module is configured to instant message the digital text data to a personal data terminal.

16. The device as in claim 13, wherein the processing module further comprises an editing module for editing the digital text data.

17. The device as in claim 13, wherein the processing module includes a voice recognition algorithm for recognizing short audible commands to operate the device.

18. The device as in claim 13, wherein the communication module is configured to connect to a wireless communications network and to receive voice mail messages, the voice mail messages being input to the input module.

19. The device as in claim 13, further comprising an audible output device configured to audibly produce the digital text data.

20. The device as in claim 13, wherein the processing module is configured to compress the digital audio data before the communication module transmits the audio file having the digital audio data to the remote processor.

21. A portable, wireless dictation device for producing text data, the portable, wireless dictation device comprising:
an input module configured to receive analog speech signals;
a processing module configured to record an audio file of the analog speech signals on the portable, wireless dictation device and to convert the analog speech signals to digital speech data;
a communication module configured to transmit the audio file having the digital speech data to a remote processor via a wireless connection using a wireless data protocol, the remote processor configured to convert the digital speech data to digital text data;
the communication module configured to receive the digital text data via the wireless connection using the wireless data protocol; and
a display module for displaying the received digital text data;
wherein the communication module is further configured to transmit the digital text data to a wireless-enabled printer configured to print the digital text data.

22. The dictation device as in claim 21, further comprising a character recognition capture device configured to receive user instructions to edit the received digital text data.

23. The dictation device as in claim 21, further comprising a keyboard configured to receive user instructions to edit the received digital text data.

24. The dictation device as in claim 21, wherein the processing module is configured to compress the digital speech data before the communication module transmits the audio file having the digital speech data to the remote processor.

25. A system for converting audio data to text data on a portable, wireless data device comprising:
at least one portable, wireless data device comprising:
an input module configured to receive analog audio speech signals;
a processing module configured record an audio file of the analog audio signals on the portable, wireless data device and to convert the analog audio speech signals to the digital audio data;

a communication module configured to transmit the audio file having the digital audio data to a remote processor via a wireless connection using a wireless data protocol and to receive digital text data from the remote processor via the wireless connection using the wireless data protocol; and a display module for displaying the received digital text data;

the remote processor configured for receiving the digital audio data via the wireless connection using the wireless data protocol, converting the digital audio data to digital text data and transmitting the converted digital text data to the at least one portable, wireless data device via the wireless connection using the wireless data protocol;

a wireless communications network for coupling the remote processor to the at least one portable, wireless data device via the wireless data protocol; and a wireless-enabled printer coupled to the wireless communication network and configured to print the digital text data received from the at least one portable, wireless data device.

26. The system as in claim 25, wherein the remote processor further includes at least one speech recognition algorithm.

27. The system as in claim 25, wherein the processing module of the at least one portable, wireless data device is configured to compress the digital audio data before the communication module transmits the audio file having the digital audio data to the remote processor.

* * * * *